US007333092B2

(12) United States Patent
Zadesky et al.

(10) Patent No.: US 7,333,092 B2
(45) Date of Patent: *Feb. 19, 2008

(54) TOUCH PAD FOR HANDHELD DEVICE

(75) Inventors: Stephen Paul Zadesky, Portola Valley, CA (US); Tang Yew Tan, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/806,957

(22) Filed: Jun. 5, 2007

(65) Prior Publication Data

US 2007/0242057 A1    Oct. 18, 2007

Related U.S. Application Data

(63) Continuation of application No. 11/386,238, filed on Mar. 21, 2006, which is a continuation of application No. 10/188,182, filed on Jul. 1, 2002, now Pat. No. 7,046,230.

(60) Provisional application No. 60/359,551, filed on Feb. 25, 2002.

(51) Int. Cl.
*G09G 5/00* (2006.01)
(52) U.S. Cl. ............... 345/169; 345/156; 345/157; 345/173; 455/550; 455/566
(58) Field of Classification Search ............... 345/156, 345/157, 160, 169, 163, 173–178
See application file for complete search history.

(56) References Cited

U.S. PATENT DOCUMENTS 1,061,578 A    5/1913    Wischhusen et al.
(Continued)

FOREIGN PATENT DOCUMENTS

CN    1139235 A    1/1997
(Continued)

OTHER PUBLICATIONS

Kevin DeMeyer, "Crystal Optical Mouse," Feb. 14, 2002, Heatseekerz, Web-Article 19.
(Continued)

*Primary Examiner*—Richard Hjerpe
*Assistant Examiner*—Jennifer T Nguyen
(74) *Attorney, Agent, or Firm*—Morrison & Foerster LLP

(57) ABSTRACT

A media device for storing and playing media such as audio, video or images, includes a memory device configured to store a plurality of media items in a digital format. The media device also includes a display configured to present a group of media items from the plurality of stored media items and to present a visual indicator that is capable of scrolling through the displayed group of media items in order to designate a specific media item from the group of media items. The media deice further includes a touch pad configured to receive input from a sliding motion or a tapping motion of a finger. The sliding motion of the finger controls the movement of the visual indicator through the group of media items. The tapping motion of the finger selects the specific media item that is designated by the visual indicator.

30 Claims, 7 Drawing Sheets

U.S. PATENT DOCUMENTS

| | | |
|---|---|---|
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 4,103,252 A | 7/1978 | Bobick |
| 4,110,749 A | 8/1978 | Janko et al. |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,293,734 A | 10/1981 | Peper, Jr. |
| D264,969 S | 6/1982 | McGourty |
| 4,380,007 A | 4/1983 | Steinegger |
| 4,380,040 A | 4/1983 | Posset |
| 4,475,008 A | 10/1984 | Doi et al. |
| 4,570,149 A | 2/1986 | Thornburg et al. |
| 4,587,378 A | 5/1986 | Moore |
| 4,644,100 A | 2/1987 | Brenner et al. |
| 4,719,524 A * | 1/1988 | Morishima et al. ...... 360/73.05 |
| 4,734,034 A | 3/1988 | Maness et al. |
| 4,736,191 A | 4/1988 | Matzke |
| 4,739,191 A * | 4/1988 | Puar ........................... 327/536 |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,798,919 A | 1/1989 | Miessler et al. |
| 4,810,992 A | 3/1989 | Eventoff |
| 4,831,359 A | 5/1989 | Newell |
| 4,849,852 A | 7/1989 | Mullins |
| 4,856,993 A | 8/1989 | Maness et al. |
| 4,866,602 A | 9/1989 | Hall |
| 4,897,511 A | 1/1990 | Itaya et al. |
| 4,914,624 A | 4/1990 | Dunthorn |
| 4,917,516 A | 4/1990 | Retter |
| 4,951,036 A | 8/1990 | Grueter et al. |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,231,326 A | 7/1993 | Echols |
| 5,237,311 A | 8/1993 | Mailey et al. |
| 5,305,017 A | 4/1994 | Gerpheide |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,495,566 A | 2/1996 | Kwatinetz |
| 5,508,703 A | 4/1996 | Okamura et al. |
| 5,543,588 A | 8/1996 | Bisset et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bler et al. |
| 5,585,823 A | 12/1996 | Duchon et al. |
| 5,589,893 A | 12/1996 | Gaughan et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Posso et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| D382,550 S | 8/1997 | Kaneko et al. |
| 5,657,012 A | 8/1997 | Tart |
| 5,661,632 A | 8/1997 | Register |
| D385,542 S | 10/1997 | Kaneko et al. |
| 5,689,285 A | 11/1997 | Asher |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,805,144 A | 9/1998 | Scholder et al. |
| 5,808,602 A | 9/1998 | Sellers |
| 5,825,353 A | 10/1998 | Will |
| 5,828,364 A | 10/1998 | Siddiqui |
| 5,838,304 A | 11/1998 | Hall |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,822 A | 1/1999 | Du et al. |
| 5,859,629 A | 1/1999 | Tognazzini |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,914,706 A | 6/1999 | Kono |
| 5,923,388 A | 7/1999 | Kurashima et al. |
| D412,940 S | 8/1999 | Kato et al. |
| 5,943,044 A | 8/1999 | Martinelli et al. |
| 5,956,019 A | 9/1999 | Bang et al. |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,122,526 A | 9/2000 | Parulski et al. |
| 6,124,587 A | 9/2000 | Bidiville et al. |
| 6,128,006 A | 10/2000 | Rosenberg et al. |

| | | | | | | |
|---|---|---|---|---|---|---|
| 6,163,312 | A | 12/2000 | Furuya | 6,978,127 | B1 | 12/2005 | Bulthuis et al. |
| 6,166,721 | A | 12/2000 | Kuroiwa et al. | 7,046,230 | B2 * | 5/2006 | Zadesky et al. ............ 345/156 |
| 6,179,496 | B1 | 1/2001 | Chou | 7,069,044 | B2 | 6/2006 | Okada et al. |
| 6,181,322 | B1 | 1/2001 | Nanavati | 7,084,856 | B2 | 8/2006 | Huppi |
| D437,860 | S | 2/2001 | Suzuki et al. | 7,113,196 | B2 | 9/2006 | Kerr |
| 6,188,393 | B1 | 2/2001 | Shu | 7,113,520 | B1 | 9/2006 | Meenan |
| 6,191,774 | B1 | 2/2001 | Schena | 7,215,319 | B2 | 5/2007 | Kamijo et al. |
| 6,198,473 | B1 | 3/2001 | Armstrong | 7,236,154 | B1 | 6/2007 | Kerr et al. |
| 6,211,861 | B1 | 4/2001 | Rosenberg et al. | 2001/0011991 | A1 | 8/2001 | Wang et al. |
| 6,219,038 | B1 | 4/2001 | Cho | 2001/0043545 | A1 | 11/2001 | Aratani |
| D442,592 | S | 5/2001 | Ledbetter et al. | 2001/0050673 | A1 | 12/2001 | Davenport |
| 6,225,976 | B1 | 5/2001 | Yates et al. | 2001/0051046 | A1 | 12/2001 | Watanabe et al. |
| 6,225,980 | B1 | 5/2001 | Weiss et al. | 2002/0027547 | A1 | 3/2002 | Kamijo |
| 6,226,534 | B1 | 5/2001 | Aizawa | 2002/0030665 | A1 | 3/2002 | Ano |
| 6,227,966 | B1 | 5/2001 | Yokoi | 2002/0033848 | A1 | 3/2002 | Sciammerella et al. |
| D443,616 | S | 6/2001 | Fisher et al. | 2002/0045960 | A1 | 4/2002 | Phillips et al. |
| 6,243,078 | B1 | 6/2001 | Rosenberg | 2002/0089545 | A1 | 7/2002 | Montalcini |
| 6,243,080 | B1 | 6/2001 | Molne | 2002/0118131 | A1 | 8/2002 | Yates et al. |
| 6,248,017 | B1 | 6/2001 | Roach | 2002/0118169 | A1 | 8/2002 | Hinkley et al. |
| 6,254,477 | B1 | 7/2001 | Sasaki et al. | 2002/0154090 | A1 | 10/2002 | Lin |
| 6,256,011 | B1 | 7/2001 | Culver | 2002/0158844 | A1 | 10/2002 | McLoone et al. |
| 6,262,717 | B1 | 7/2001 | Donohue et al. | 2002/0164156 | A1 | 11/2002 | Bilbrey |
| 6,262,785 | B1 | 7/2001 | Kim | 2002/0180701 | A1 | 12/2002 | Hayama et al. |
| 6,266,050 | B1 | 7/2001 | Oh et al. | 2003/0002246 | A1 | 1/2003 | Kerr |
| D448,810 | S | 10/2001 | Goto | 2003/0025679 | A1 | 2/2003 | Taylor et al. |
| 6,297,795 | B1 | 10/2001 | Kato et al. | 2003/0043121 | A1 | 3/2003 | Chen |
| D450,713 | S | 11/2001 | Masamitsu et al. | 2003/0043174 | A1 | 3/2003 | Hinckley et al. |
| 6,314,483 | B1 | 11/2001 | Goto et al. | 2003/0050092 | A1 | 3/2003 | Yun |
| 6,323,845 | B1 | 11/2001 | Robbins | 2003/0076301 | A1 | 4/2003 | Tsuk et al. |
| D452,250 | S | 12/2001 | Chan | 2003/0076303 | A1 | 4/2003 | Huppi |
| 6,340,800 | B1 | 1/2002 | Zhai et al. | 2003/0095095 | A1 | 5/2003 | Pihlaja |
| D454,568 | S | 3/2002 | Andre et al. | 2003/0095096 | A1 | 5/2003 | Robbin et al. |
| 6,357,887 | B1 | 3/2002 | Novak | 2003/0098851 | A1 | 5/2003 | Brink |
| D455,793 | S | 4/2002 | Lin | 2003/0184517 | A1 | 10/2003 | Senzui et al. |
| 6,373,470 | B1 | 4/2002 | Andre et al. | 2003/0206202 | A1 | 11/2003 | Moriya |
| 6,377,530 | B1 | 4/2002 | Burrows | 2004/0156192 | A1 | 8/2004 | Kerr et al. |
| 6,396,523 | B1 * | 5/2002 | Segal et al. .................. 715/863 | 2004/0215986 | A1 | 10/2004 | Shakkarwar |
| 6,424,338 | B1 | 7/2002 | Anderson | 2004/0224638 | A1 | 11/2004 | Fadell et al. |
| 6,429,846 | B2 | 8/2002 | Rosenberg et al. | 2004/0239622 | A1 | 12/2004 | Proctor et al. |
| 6,429,852 | B1 | 8/2002 | Adams et al. | 2004/0252109 | A1 | 12/2004 | Trent, Jr. et al. |
| 6,473,069 | B1 | 10/2002 | Gerpheide | 2004/0253989 | A1 | 12/2004 | Tupler et al. |
| 6,492,979 | B1 | 12/2002 | Kent et al. | 2004/0263388 | A1 | 12/2004 | Krumm et al. |
| 6,496,181 | B1 | 12/2002 | Bomer et al. | 2004/0267874 | A1 | 12/2004 | Westberg et al. |
| 6,497,412 | B1 | 12/2002 | Bramm | 2005/0052425 | A1 | 3/2005 | Zadesky et al. |
| D468,365 | S | 1/2003 | Bransky et al. | 2006/0026521 | A1 | 2/2006 | Hotelling et al. |
| D469,109 | S | 1/2003 | Andre et al. | 2006/0097991 | A1 | 5/2006 | Hotelling et al. |
| D472,245 | S | 3/2003 | Andre et al. | 2006/0181517 | A1 | 8/2006 | Zadesky et al. |
| 6,587,091 | B2 | 7/2003 | Serpa | 2006/0197750 | A1 | 9/2006 | Kerr et al. |
| 6,636,197 | B1 | 10/2003 | Goldenberg et al. | 2006/0250377 | A1 | 11/2006 | Zadesky et al. |
| 6,639,584 | B1 * | 10/2003 | Li .............................. 345/173 | 2006/0274905 | A1 | 12/2006 | Lindahl et al. |
| 6,650,975 | B2 | 11/2003 | Ruffner | 2007/0013671 | A1 | 1/2007 | Zadesky et al. |
| D483,809 | S | 12/2003 | Lim | 2007/0052044 | A1 | 3/2007 | Forsblad et al. |
| 6,664,951 | B1 * | 12/2003 | Fujii et al. .................. 345/173 | 2007/0052691 | A1 | 3/2007 | Zadesky et al. |
| 6,677,927 | B1 | 1/2004 | Bruck | 2007/0080936 | A1 | 4/2007 | Tsuk et al. |
| 6,686,904 | B1 | 2/2004 | Sherman et al. | 2007/0080938 | A1 | 4/2007 | Robbin et al. |
| 6,703,550 | B2 | 3/2004 | Chu | 2007/0083822 | A1 | 4/2007 | Robbin et al. |
| 6,724,817 | B1 | 4/2004 | Simpson et al. | 2007/0085841 | A1 | 4/2007 | Tsuk et al. |
| 6,727,889 | B2 | 4/2004 | Shaw | 2007/0152977 | A1 | 7/2007 | Ng et al. |
| D489,731 | S | 5/2004 | Huang | 2007/0152983 | A1 * | 7/2007 | McKillop et al. ........... 345/173 |
| 6,738,045 | B2 | 5/2004 | Hinckley et al. | | | | |
| 6,750,803 | B2 | 6/2004 | Yates et al. | | | | |
| 6,781,576 | B2 * | 8/2004 | Tamura ....................... 345/173 | | | | |
| 6,788,288 | B2 | 9/2004 | Ano | | | | |
| 6,791,533 | B2 | 9/2004 | Su et al. | | | | |
| 6,795,057 | B2 | 9/2004 | Gordon | | | | |
| D497,618 | S | 10/2004 | Andre et al. | | | | |
| 6,844,872 | B1 | 1/2005 | Farag et al. | | | | |
| 6,886,842 | B2 | 5/2005 | Vey et al. | | | | |
| 6,894,916 | B2 | 5/2005 | Reohr et al. | | | | |
| D506,476 | S | 6/2005 | Andre et al. | | | | |
| 6,922,189 | B2 | 7/2005 | Fujiyoshi | | | | |
| 6,930,494 | B2 | 8/2005 | Tesdahl et al. | | | | |
| 6,977,808 | B2 | 12/2005 | Lam et al. | | | | |

FOREIGN PATENT DOCUMENTS

| | | |
|---|---|---|
| CN | 1455615 | 11/2003 |
| CN | 1499356 | 5/2004 |
| DE | 3615742 A1 | 11/1987 |
| DE | 19722636 A1 | 12/1998 |
| DE | 10022537 A1 | 11/2000 |
| DE | 20019074 U1 | 2/2001 |
| EP | 0-498-540 A2 | 8/1992 |
| EP | 0521683 A2 | 1/1993 |
| EP | 0674288 A1 | 9/1995 |
| EP | 0 731 407 A1 | 9/1996 |
| EP | 0 551 778 B1 | 1/1997 |

| | | |
|---|---|---|
| EP | 0551778 B1 | 1/1997 |
| EP | 0-880-091 A1 | 11/1998 |
| EP | 1-026-713 A1 | 8/2000 |
| EP | 1081922 A2 | 3/2001 |
| EP | 1098241 A2 | 5/2001 |
| EP | 1 162 826 A2 | 12/2001 |
| EP | 1205836 A2 | 5/2002 |
| EP | 1251455 A2 | 10/2002 |
| EP | 1482401 A2 | 12/2004 |
| EP | 1542437 A2 | 6/2005 |
| FR | 2 686 440 A1 | 7/1993 |
| GB | 2315186 | 1/1998 |
| GB | 2391060 | 1/2004 |
| GB | 2402105 A | 12/2004 |
| JP | 55-174009 | 6/1982 |
| JP | 57-95722 | 6/1985 |
| JP | 61-117619 | 6/1986 |
| JP | 61-124009 A | 6/1986 |
| JP | 61-164547 | 1/1988 |
| JP | 63-106826 A | 5/1988 |
| JP | 63-181022 | 7/1988 |
| JP | 63-298518 | 12/1988 |
| JP | 03-57617 | 6/1991 |
| JP | 04-32920 | 2/1992 |
| JP | 5-041135 | 2/1993 |
| JP | 05-080938 A | 4/1993 |
| JP | 5-101741 | 4/1993 |
| JP | 05-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 05-233141 | 9/1993 |
| JP | 05-262276 | 10/1993 |
| JP | 5-265656 | 10/1993 |
| JP | 5-274956 | 10/1993 |
| JP | 05-289811 | 11/1993 |
| JP | 5-298955 | 11/1993 |
| JP | 5-325723 | 12/1993 |
| JP | 06-20570 | 1/1994 |
| JP | 6-084428 | 3/1994 |
| JP | 6-089636 | 3/1994 |
| JP | 06-096639 | 4/1994 |
| JP | 6-96639 | 4/1994 |
| JP | 06-111685 | 4/1994 |
| JP | 6-111695 | 4/1994 |
| JP | 06-111695 | 4/1994 |
| JP | 6-139879 | 5/1994 |
| JP | 06-187078 | 7/1994 |
| JP | 06-208433 | 7/1994 |
| JP | 6-267382 | 9/1994 |
| JP | 06-283993 | 10/1994 |
| JP | 6-333459 | 12/1994 |
| JP | 7-107574 | 4/1995 |
| JP | 07-107574 | 4/1995 |
| JP | 07-107574 A | 4/1995 |
| JP | 7-41882 | 7/1995 |
| JP | 07-41882 | 7/1995 |
| JP | 7-201249 | 8/1995 |
| JP | 07-201256 | 8/1995 |
| JP | 07-253838 | 10/1995 |
| JP | 7-261899 | 10/1995 |
| JP | 07-261899 | 10/1995 |
| JP | 07-261899 A | 10/1995 |
| JP | 7-261922 | 10/1995 |
| JP | 07-296670 | 11/1995 |
| JP | 07-319001 A | 12/1995 |
| JP | 08-016292 | 1/1996 |
| JP | 08-115158 | 5/1996 |
| JP | 8-115158 | 5/1996 |
| JP | 8-203387 | 8/1996 |
| JP | 8-293226 | 11/1996 |
| JP | 8-298045 | 11/1996 |
| JP | 08-299541 | 11/1996 |
| JP | 8-316664 | 11/1996 |
| JP | 09-044289 | 2/1997 |
| JP | 09-069023 | 3/1997 |
| JP | 09-128148 | 5/1997 |
| JP | 9-218747 | 8/1997 |
| JP | 9-230993 | 9/1997 |
| JP | 09-230993 | 9/1997 |
| JP | 9-231858 | 9/1997 |
| JP | 09-233161 | 9/1997 |
| JP | 9-251347 | 9/1997 |
| JP | 9-258895 | 10/1997 |
| JP | 9-288926 | 11/1997 |
| JP | 10-074429 | 3/1998 |
| JP | 10-198507 | 7/1998 |
| JP | 10-227878 | 8/1998 |
| JP | 10-326149 A | 12/1998 |
| JP | 11-184607 | 7/1999 |
| JP | 11-194863 * | 7/1999 |
| JP | 11-194863 A | 7/1999 |
| JP | 11-194872 | 7/1999 |
| JP | 11-194872 A | 7/1999 |
| JP | 11-194882 | 7/1999 |
| JP | 11-194883 | 7/1999 |
| JP | 11-194883 A | 7/1999 |
| JP | 11-194891 | 7/1999 |
| JP | 11-195353 | 7/1999 |
| JP | 11-203045 | 7/1999 |
| JP | 100-12010 | 7/1999 |
| JP | 100-12025 | 7/1999 |
| JP | 100-12026 | 7/1999 |
| JP | 100-12027 | 7/1999 |
| JP | 100-12028 | 7/1999 |
| JP | 100-12029 | 7/1999 |
| JP | 11-272378 | 10/1999 |
| JP | 11-272378 A | 10/1999 |
| JP | 100-89535 | 10/1999 |
| JP | 2000-215549 | 8/2000 |
| JP | 2000-267786 | 9/2000 |
| JP | 2000-353045 A | 12/2000 |
| JP | 2001-11769 | 1/2001 |
| JP | 2001-22508 | 1/2001 |
| JP | 2002-215311 | 8/2002 |
| JP | 2003-280807 | 10/2003 |
| JP | 2005-99635 | 9/2005 |
| JP | 2005-133824 | 10/2005 |
| JP | 2005-134953 | 10/2005 |
| JP | 2005-235579 | 1/2006 |
| JP | A 2005-358970 | 7/2006 |
| JP | 3852854 | 9/2006 |
| JP | 3852854 | 12/2006 |
| JP | A 2005-312433 | 5/2007 |
| KR | 1998-71394 | 10/1998 |
| KR | 1999-50198 | 7/1999 |
| KR | 2000-08579 | 2/2000 |
| TW | 431607 | 4/2001 |
| WO | WO 94/17494 | 8/1994 |
| WO | WO 95/00897 A1 | 1/1995 |
| WO | WO 98/14863 | 4/1998 |
| WO | WO-99/49443 | 9/1999 |
| WO | WO-03/044645 A1 | 5/2003 |
| WO | WO-2005/055620 A2 | 6/2005 |
| WO | WO-2005/124526 A2 | 12/2005 |

OTHER PUBLICATIONS

Letter re: Bang & Olufsen A/S, by David Safran, Nixon Peabody, LLP May 21, 2004.
Marriot et al. U.S. Appl. No. 10/722,948, filed Nov. 25, 2003.
Photographs of Innovations 2000 Best of Show award presented at the 2000 International CES Innovations 2000 Design & Engineering Showcase, 1 pg.
U.S. Appl. No. 10/060,712, filed Jan. 29, 2002.

Sylvania, "Intellivision™ Intelligent Television Master Component Service Manual," pp. 1, 2 and 8, 1979.
Tessler et al. "Touchpads Three new input devices", website www.macworld.com/1996/02/review/1806.html, downloaded Feb. 13, 2002.
U.S. Appl. No. 10/209,537, filed Jul. 30, 2002.
Fiore, Andrew, "Zen Touchpad", Cornell University, May 2000.
Gadgetboy, "Point and Click with the latest mice", CNET Asia Product Review, www.asia.cnet.com/reviews...are/gadgetboy/0,039001770,38023590,00.htm, downloaded Dec. 5, 2001.
Bang & Olufsen Telecom a/s, "BeoCom 6000 User User Guide 2000."
BeoCom 6000, Sales Training Brochure, date unknown.
Chapweske, Adam, "PS/2 Mouse/Keyboard Protocol", 1999, http://panda.cs.ndsu.nodak.edu/~achapwes/PICmicro/PS2/ps2.htm.
"Synaptics *Touch* Pad Interfacing Guide" Second Edition, Mar. 25, 1998, Synaptics, Inc. San Jose, CA pp. 1-90.
"System Service and Trouble Shooting Manual," www.dsplib.com/intv/Master, downloaded Dec. 11, 2002.
"Product Overview-ErgoCommander®", www.logicad3d.com/products/ErgoCommander.htm, downloaded Apr. 8, 2002.
"Product Overview-SpaceMouse® Classic", www.logicad3d.com/products/classic.htm, downloaded Apr. 8, 2002.
"OEM Touchpad Modules" website www.glidepoint.com/sales/modules.index.shtml, downloaded Feb. 13, 2002.
"Neuros MP3 Digital Audio Computer", www.neurosaudio.com, downloaded Apr. 9, 2003.
"Der Klangmeister," Connect Magazine, Aug. 1998.
"Apple Unveils Optical Mouse and New Pro Keybord," Press Release, Jul. 19, 2000.
"About Quicktip®" www.logicad3d.com/docs/qt.html, downloaded Apr. 8, 2002.
"Atari VCS/2600 Peripherals", www.classicgaming.com, downloaded Feb. 28, 2007, pp. 1-15.
"Alps Electric introduces the GlidePoint Wave Keyboard; combines a gently curved design with Alps' advanced GlidePoint Technology", Business Wire, (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
"APS show guide to exhibitors", Physics Today, 49(3) (Mar. 1996).
"Design News literature plus", Design News, 51(24) (Dec. 18, 1995).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & Refrigerator News, 200(2) (Jan. 13, 1997).
"Product news", Design News, 53(11) (Jun. 9, 1997).
"Product news", Design News, 53(9) (May 5, 1997).
Ahl, David, "Controller Updated", Creative Computing 9(12) (Dec. 1983).
Baig, E.C., "Your PC Might Just Need a Mouse," U.S. News and World Report, 108(22) (Jun. 4, 1990).
Bartimo, Jim, "The Portables: Traveling Quickly", Computerworld (Nov. 14, 1983).
Brink et al., "Pumped-up portables", U.S. News & World Report, 116(21) (May 30, 1994).
Brown et al., "Windows on Tablets as a Means of Achieving Virtual Input Devices", Human-Computer Interaction—INTERACT '90 (1990).
Buxton et al., "Issues and Techniques in Touch-Sensitive Tablet Input", Computer Graphics, 19(3), Proceedings of SIGGRAPH '85 (1985).
Chen et al., "A Study in Interactive 3-D Rotation Using 2-D Control Devices", Computer Graphics 22(4) (Aug. 1988).

Evans et al., "Tablet-based Valuators that Provide One, Two, or Three Degrees of Freedom", Computer Graphics 15(3) (Aug. 1981).
Jesitus, John, "Broken promises?", Industry Week/IW, 246(20) (Nov. 3, 1997).
Mims, Forrest M. III, "A Few Quick Pointers; Mouses, Touch Screens, Touch Pads, Light Pads, and the Like Can Make Your System Easier to Use," Computers and Electronics, 22 (May 1984).
Nass, Richard, "Touchpad input device goes digital to give portable systems a desktop "mouse-like" feel", Electronic Design, 44(18) (Sep. 3, 1996).
Perenson, Melissa, "New & Improved: Touchpad Redux", PC Magazine (Sep. 10, 1996).
Petersen, marty, "KoalapadTouch tablet & Micro Illustrator Software," InfoWorld, (Oct. 10, 1983).
Petruzzellis, "Force-Sensing Resistors" Electronics Now, 64(3), (Mar. 1993).
Soderholm, Lars D., "Sensing Systems for 'Touch and Feel,'" Design News (May 8, 1989).
Sony presents "Choice Without Compromise" at IBC '97 M2 PRESSWIRE (Jul. 24, 1997).
Spiwak, Marc, "A Great New Wireless Keyboard", Popular Electronics, 14(12) (Dec. 1997).
Spiwak, Marc, "A Pair of Unusual Controllers", Popular Electronics 14(4) (Apr. 1997).
Tessler, Franklin, "Point Pad", Macworld 12(10) (Oct. 1995).
Tessler, Franklin, "Smart Input: How to Chose from the New Generation of Innovative input Devices," Macworld 13(5) (May 1996).
Tessler, Franklin, "Touchpads", Macworld 13(2) (Feb. 1996).
"Triax Custom Controllers Due; Video Game Controllers," HFD-The Weekly Home Furnishings Newspaper 67(1) (Jan. 4, 1993).
Chinese Office Action issue Dec. 29, 2006, directed to CN Application No. 200510103886.3, 25 pages.
"System Service and Troubleshooting Manual," www.dsplib.com/intv/Master, downloaded Dec. 11, 2002.
"Apple Presents iPod: Ultra-Portable MP3 Music Player Plus 1,000 Songs in Your Pocket," retreived from http://www.apple.com/pr/library/2001/oct/23ipod.html on Oct. 23, 2001.
Bray, "Phosphors help switch on xenon," Physics in Action, pp. 1-3, Apr. 1999.
EVB Elektronik "TSOP6238 IR Receiver Modules for Infrared Remote Control Systems" dated Jan. 2004 1 page.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Luna Technologies International, Inc., LUNA Photoluminescent Safety Products, "Photoluminescence-What is Photoluminescence?" from website at http://www.lunaplast.com/photoluminescence.com on Dec. 27, 2005.
Ahmad, "A Usable Real-Time 3D Hand Tracker," Proceedings of the 28th Asilomar Conference on Signals, Systems and Computers—Part 2 (of 2) vol. 2 (Oct. 1994), 5 pages.
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," *Computer Human Interaction*: 16 pages.
Kobayashi et al. "Development of the Touch Switches with the Click Response," Koukuu Denshi Gihou No. 17: pp. 44-48 (Mar. 1994) (published by the Japan Aviation Electronics Industry, Ltd.); Translation of Summary.

\* cited by examiner

TOUCH PAD FOR HANDHELD DEVICE

CROSS REFERENCE TO RELATED APPLICATION

This application is a continuation of U.S. patent application Ser. No. 11/386,238 entitled "Touch Pad for Handheld Device" filed Mar. 21, 2006, which is a continuation of U.S. patent application Ser. No. 10/188,182 entitled "Touch Pad for Handheld Device" filed Jul. 1, 2002 now U.S. Pat. No. 7,046,230, which claims the priority of U.S. Provisional Patent Application No. 60/359,551, entitled "Touch Pad for Handheld Device," filed on Feb. 25, 2002, all of which are incorporated herein by reference.

This application is related to U.S. patent application No. 60/346,237, entitled "Method and System for List Scrolling," filed on Oct. 22, 2001, and which is incorporated herein by reference.

This application is also related to U.S. Design Patent Application No. 29/153,169, entitled "MEDIA PLAYER," filed on Oct. 22, 2001, and which is incorporated herein by reference.

BACKGROUND OF THE INVENTION

1. Field of the Invention

The present invention relates generally to a media player having a touch pad. More particularly, the present invention relates to touch pads having scrolling features.

2. Description of the Related Art

There exist today many styles of input devices for performing operations in a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.). In the case of hand-held personal digital assistants (PDA), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases a dedicated portion of the touch pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

In addition to allowing input pointer movements and selections with respect to a GUI presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

With regards to touch pads, mice and track balls, a Cartesian coordinate system is used to monitor the position of the finger, mouse and ball, respectively, as they are moved. The Cartesian coordinate system is generally defined as a two dimensional coordinate system (x, y) in which the coordinates of a point (e.g., position of finger, mouse or ball) are its distances from two intersecting, often perpendicular straight lines, the distance from each being measured along a straight line parallel to each other. For example, the x, y positions of the mouse, ball and finger may be monitored. The x, y positions are then used to correspondingly locate and move the input pointer on the display screen.

To elaborate further, touch pads generally include one or more sensors for detecting the proximity of the finger thereto. By way of example, the sensors may be based on resistive sensing, surface acoustic wave sensing, pressure sensing (e.g., strain gauge), optical sensing, capacitive sensing and the like. The sensors are generally dispersed about the touch pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the touch pad. For brevity sake, the remaining discussion will be held to the discussion of capacitive sensing technologies. It should be noted, however, that the other technologies have similar features.

Capacitive sensing touch pads generally contain several layers of material. For example, the touch pad may include a protective shield, one or more electrode layers and a circuit board. The protective shield typically covers the electrode layer(s), and the electrode layer(s) is generally disposed on a front side of the circuit board. As is generally well known, the protective shield is the part of the touch pad that is touched by the user to implement cursor movements on a display screen. The electrode layer(s), on the other hand, is used to interpret the x, y position of the user's finger when the user's finger is resting or moving on the protective shield. The electrode layer (s) typically consists of a plurality of electrodes that are positioned in columns and rows so as to form a grid array. The columns and rows are generally based on the Cartesian coordinate system and thus the rows and columns correspond to the x and y directions.

The touch pad may also include sensing electronics for detecting signals associated with the electrodes. For example, the sensing electronics may be adapted to detect the change in capacitance at each of the electrodes as the finger passes over the grid. The sensing electronics are generally located on the backside of the circuit board. By way of example, the sensing electronics may include an application specific integrated circuit (ASIC) that is configured to measure the amount of capacitance in each of the electrodes and to compute the position of finger movement based on the capacitance in each of the electrodes. The ASIC may also be configured to report this information to the computing device.

Referring to FIG. 1, a touch pad 10 will be described in greater detail. The touch pad is generally a small rectangular area that includes a protective shield 12 and a plurality of electrodes 14 disposed underneath the protective shield layer 12. For ease of discussion, a portion of the protective shield layer 12 has been removed to show the electrodes 14. Each of the electrodes 14 represents a different x, y position. In one configuration, as a finger 16 approaches the electrode grid 14, a tiny capacitance forms between the finger 16 and the electrodes 14 proximate the finger 16. The circuit board/sensing electronics measures capacitance and produces an x, y input signal 18 corresponding to the active electrodes 14 is sent to a host device 20 having a display screen 22. The x, y input signal 18 is used to control the movement of a cursor 24 on a display screen 22. As shown, the input pointer moves in a similar x, y direction as the detected x, y finger motion.

SUMMARY OF THE INVENTION

In view of the foregoing, it would be desirable to provide a media player with a touch pad. It would also be desirable to provide a hand held device with a touch pad. It would additionally be desirable to provide a touch pad that can sense and resolve angular and/or radial positions of a moving object (e.g., finger) as it is moved in a rotating and/or radial manner across the touch pad. That is, a touch pad that is based on polar coordinates rather than Cartesian coordinates. It would be further desirable to transform the angular or radial movements into translational movements in the GUI of the display screen for scrolling and other related linear actions.

The invention relates, in one embodiment, to a media player for storing and playing media such as audio, video or images. The media player includes a housing that encloses internally various electrical components that provide computing operations for the media player. The media player also includes a touch pad supported by the housing and configured to provide one or more control functions for controlling various applications associated with the media player.

The invention relates, in another embodiment, to a pocket sized handheld computing device. The computing device includes computing hardware for providing at least one application. The computing device also includes a display screen configured to display text and graphics associated with the at least one application. The computing device additionally includes a touch pad configured to provide one or more control functions for allowing a user of the computing device to provide inputs to the at least one application.

The invention relates, in another embodiment, to a touch pad assembly for use in a computing device. The touch pad assembly has a touch sensitive surface for accepting contact with an object. The touch pad assembly is configured to provide polar coordinate information of the object relative to the touch sensitive surface when the object is moved about the touch sensitive surface.

The invention relates, in another embodiment, to a user input system having a touch pad, a display and a controller. The system is configured to convert angular or radial data associated with the touch pad into control inputs associated with the display. By way of example, the control inputs may correspond to translational movements associated with scrolling or other related linear actions.

The invention relates, in another embodiment, to a handheld electronic device for storing and playing media such as audio, video or images. The handheld electronic device includes a memory device configured to store a plurality of media items in a digital format. The handheld electronic device also includes a display configured to present a group of media items from the plurality of stored media items and to present a visual indicator that is capable of scrolling through the displayed group of media items in order to designate a specific media item from the group of media items. The handheld electronic device further includes a touch pad configured to receive input from a sliding motion or a tapping motion of a finger. The sliding motion of the finger controls the movement of the visual indicator through the group of media items. The tapping motion of the finger selects the specific media item that is designated by the visual indicator.

The invention relates, in another embodiment, to a battery powered handheld music player. The battery powered music player includes a housing that supports various electrical components that provide computing operations for the music player. The battery powered music player also includes a memory device disposed inside the housing and configured to store a plurality of songs in a digital format. The battery powered music player further includes a display screen provided at a first portion of a front surface of the housing and configured to present a list of songs from the plurality of stored songs and to present a visual indicator that is capable of linearly traversing through the list of songs in order to designate a specific song from the list of songs. The battery powered music player additionally includes a single integrated input arrangement provided at a second portion of the front surface of the housing. The single integrated input arrangement includes a plurality of input regions that are adjacent one another and that provide control functions for operating the music player. At least one of the input regions being implemented with a touch pad. Moreover, the battery powered music player includes audio output components for outputting music associated with a selected specific song from the list of songs.

The invention relates, in another embodiment, to a battery powered handheld device capable of playing media. The battery powered handheld device includes a housing that supports various electrical components that provide computing operations for the battery powered handheld device. The battery powered handheld device also includes a memory device disposed inside the housing and configured to store a plurality of menu items. The battery powered handheld device further includes a display screen provided at a first portion of a front surface of the housing, and configured to present a list of menu items and to present a visual indicator that is capable of linearly traversing through the list of menu items in order to designate a specific menu item from the list of menu items. The battery powered handheld device additionally includes an input arrangement provided at a second portion of the front surface of the housing. The input arrangement includes an inner input region and one or more outer input regions that provide control functions for operating the battery powered handheld device. The outer input regions are disposed outside the inner input region. The inner input region includes at least a touch pad.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to touch pads. According to one aspect of the invention, a touch pad is provided on a media player to facilitate user interaction therewith. In one embodiment, the media player is a handheld device. According to another aspect of the invention, a touch pad is provided that can sense and resolve angular and/or radial positions of a moving object (e.g., finger) as it is moved in a largely rotational and/or radial manner across the touch pad. In one embodiment, the touch pad that is based on polar coordinates rather than Cartesian coordinates. Other aspects of the invention will become apparent below. In any case, the aspects are not limiting and the various aspects of the invention can be used separately or in combination.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
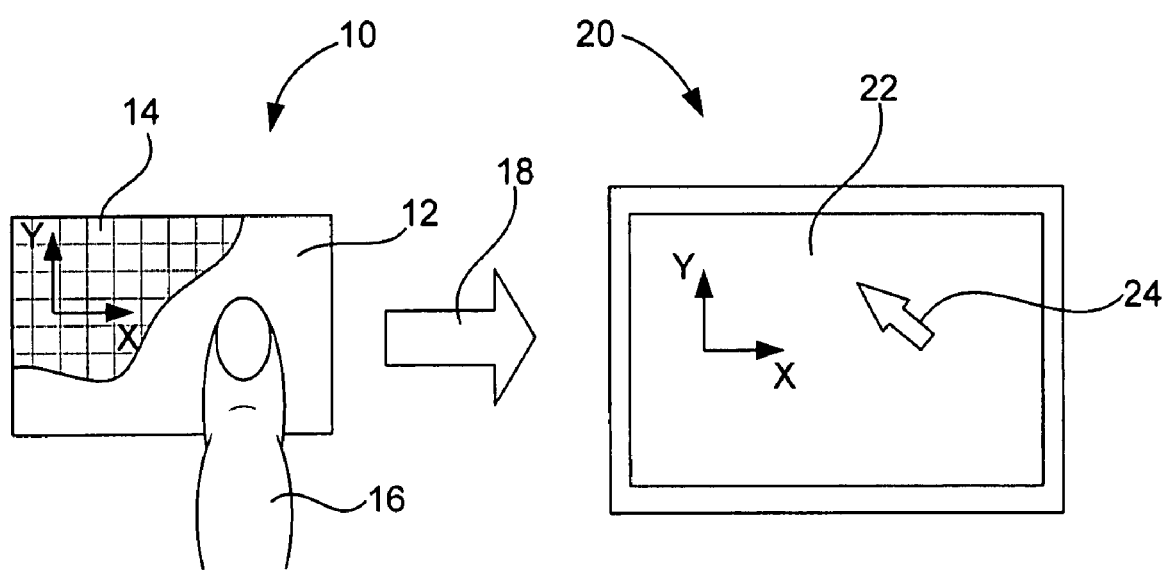
FIG. 1 is a simplified diagram of a touch pad and display.
Figure 2:
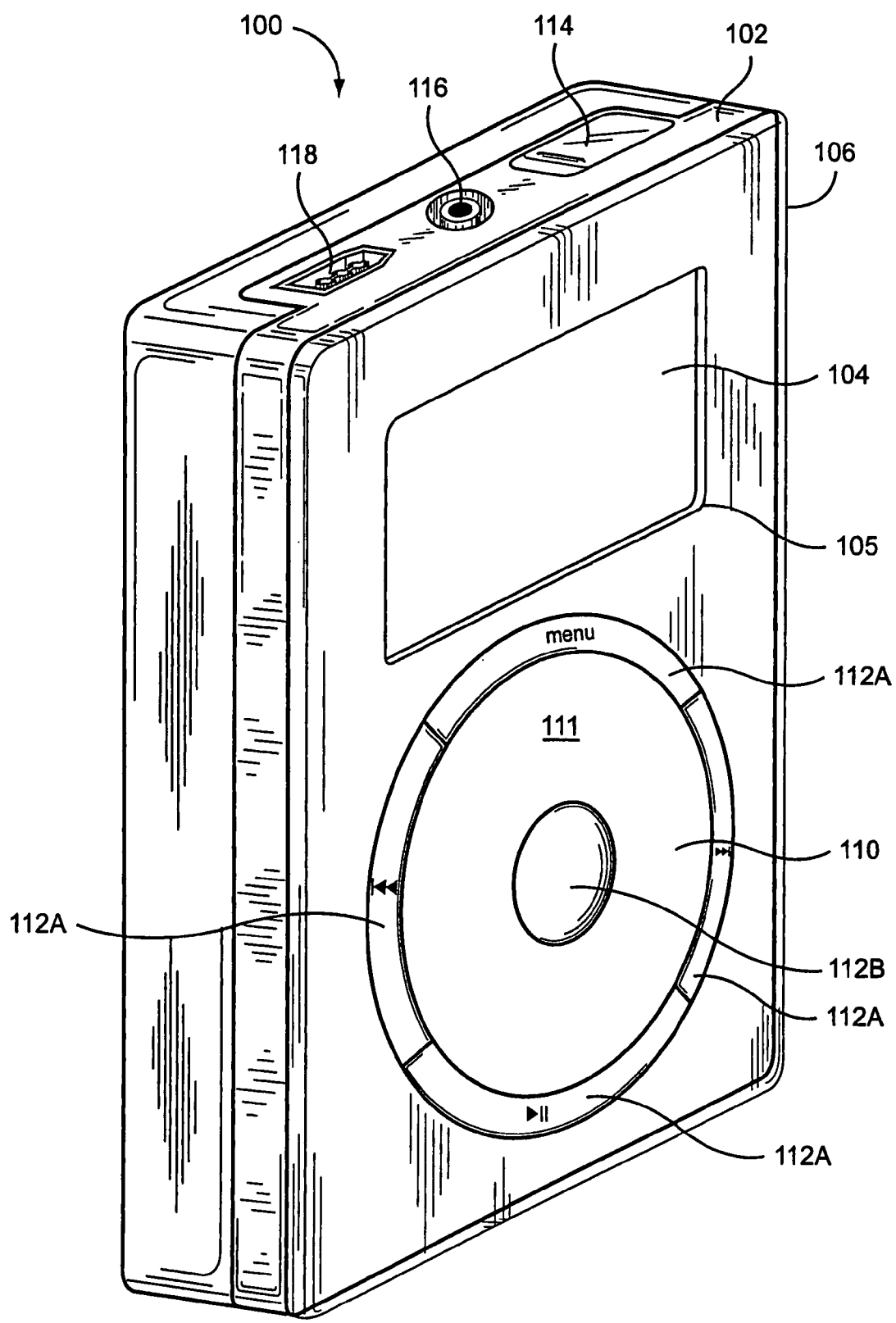
FIG. 2 is a perspective view of a media player, in accordance with one embodiment of the present invention.

FIG. 2 is a perspective diagram of a media player 100, in accordance with one embodiment of the present invention. The term "media player" generally refers to computing devices that are dedicated to processing media such as audio, video or other images, as for example, music players, game players, video players, video recorders, cameras and the like. These devices are generally portable so as to allow a user to listen to music, play games or video, record video or take pictures wherever the user travels. In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a portable computer). For example, in the case of a music player, a user may use the device while working out at the gym. In case of a camera, a user may use the device while mountain climbing. Furthermore, the device may be operated by the users hands, no reference surface such as a desktop is needed (this is shown in greater detail in FIG. 3).

Media players generally have connection capabilities that allow a user to upload and download data to and from a host device such as a general purpose computer (e.g., desktop computer, portable computer). For example, in the case of a camera, photo images may be downloaded to the general purpose computer for further processing (e.g., printing). With regards to music players, songs and play lists stored on the general purpose computer may be downloaded into the music player. In the illustrated embodiment, the media player 100 is a pocket sized hand held MP3 music player that allows a user to store a large collection of music. By way of example, the MP3 music player may store up to 1,000 CD-quality songs.

As shown in FIG. 2, the media player 100 includes a housing 102 that encloses internally various electrical components (including integrated circuit chips and other circuitry) to provide computing operations for the media player 100. The integrated circuit chips and other circuitry may include a microprocessor, memory (e.g., ROM, RAM), a power supply (e.g., battery), a circuit board, a hard drive, and various input/output (I/O) support circuitry. In the case of music players, the electrical components may include components for outputting music such as an amplifier and a digital signal processor (DSP). In the case of video recorders or cameras the electrical components may include components for capturing images such as image sensors (e.g., charge coupled device (CCD) or complimentary oxide semiconductor (CMOS)) or optics (e.g., lenses, splitters, filters). In addition to the above, the housing may also define the shape or form of the media player. That is, the contour of the housing 102 may embody the outward physical appearance of the media player 100.

The media player 100 also includes a display screen 104. The display screen 104 is used to display a graphical user interface as well as other information to the user (e.g., text, objects, graphics). By way of example, the display screen 104 may be a liquid crystal display (LCD). In one particular embodiment, the display screen corresponds to a 160-by-128-pixel high-resolution display, with a white LED backlight to give clear visibility in daylight as well as low-light conditions. As shown, the display screen 104 is visible to a user of the media player 100 through an opening 105 in the housing 102, and through a transparent wall 106 that is disposed in front of the opening 105. Although transparent, the transparent wall 106 may be considered part of the housing 102 since it helps to define the shape or form of the media player 100.

The media player 100 also includes a touch pad 110. The touch pad 110 is configured to provide one or more control functions for controlling various applications associated with the media player 100. For example, the touch initiated control function may be used to move an object or perform an action on the display screen 104 or to make selections or issue commands associated with operating the media player 100. In most cases, the touch pad 110 is arranged to receive input from a finger moving across the surface of the touch pad 110 in order to implement the touch initiated control function. The touch pad may be widely varied. For example, the touch pad be a conventional touch pad based on the Cartesian coordinate system, or the touch pad may be a touch pad based on a polar coordinate system (the later will be described in greater detail below).

The manner in which the touch pad 110 receives input may be widely varied. In one embodiment, the touch pad 110 is configured receive input from a linear finger motion. In another embodiment, the touch pad 110 is configured receive input from a rotary or swirling finger motion. In yet another embodiment, the touch pad 110 is configured receive input from a radial finger motion. Additionally or alternatively, the touch pad 110 may be arranged to receive input from a finger tapping on the touch pad 100. By way of example, the tapping finger may initiate a control function for playing a song, opening a menu and the like.

In one embodiment, the control function corresponds to a scrolling feature. For example, in the case of an MP3 player, the moving finger may initiate a control function for scrolling through a song menu displayed on the display screen 104. The term "scrolling" as used herein generally pertains to moving displayed data or images (e.g., text or graphics) across a viewing area on a display screen 104 so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen 104 or it may only be a portion of the display screen 104 (e.g., a window frame).

The direction of scrolling may be widely varied. For example, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area. In one implementation, the scrolling feature may be used to move a Graphical User Interface (GUI) vertically (up and down), or horizontally (left and right) in order to bring more data into view on a display screen. By way of example, in the case of an MP3 player, the scrolling feature may be used to help browse through songs stored in the MP3 player. The direction that the finger moves may be arranged to control the direction of scrolling. For example, the touch pad may be arranged to move the GUI vertically up when the finger is moved in a first direction and vertically down when the finger is moved in a second direction To elaborate, the display screen 104, during operation, may display a list of media items (e.g., songs). A user of the media player 100 is able to linearly scroll through the list of media items by moving his or her finger across the touch pad 110. As the finger moves around the touch pad 110, the displayed items from the list of media items are varied such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by moving his or her finger at greater speeds.

In one embodiment, the media player 100 via the touch pad 110 is configured to transform a swirling or whirling motion of a finger into translational or linear motion, as in scrolling, on the display screen 104. In this embodiment, the touch pad 110 is configured to determine the angular location, direction, speed and acceleration of the finger when the finger is moved across the top planar surface of the touch pad 110 in a rotating manner, and to transform this information into signals that initiate linear scrolling on the display screen 104. In another embodiment, the media player 100 via the touch pad 110 is configured to transform radial motion of a finger into translational or linear motion, as in scrolling, on the display screen 104. In this embodiment, the touch pad 110 is configured to determine the radial location, direction, speed and acceleration of the finger when the finger is moved across the top planar surface of the touch pad 110 in a radial manner, and to transform this information into signals that initiate linear scrolling on the display screen 104. In another embodiment, the media player 100 via the touch pad 202 is configured to transform both angular and radial motion of a finger into translational or linear motion, as in scrolling, on the display screen 104.

The touch pad generally consists of a touchable outer surface 111 for receiving a finger for manipulation on the touch pad 110. Although not shown in FIG. 2, beneath the touchable outer surface 111 is a sensor arrangement. The sensor arrangement includes a plurality of sensors that are configured to activate as the finger passes over them. In the simplest case, an electrical signal is produced each time the finger passes a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 100 to perform the desired control function on the display screen 104.

The position of the touch pad 110 relative to the housing 102 may be widely varied. For example, the touch pad 110 may be placed at any external surface (e.g., top, side, front, or back) of the housing 102 that is accessible to a user during manipulation of the media player 100. In most cases, the touch sensitive surface 111 of the touch pad 110 is completely exposed to the user. In the illustrated embodiment, the touch pad 110 is located in a lower, front area of the housing 102. Furthermore, the touch pad 110 may be recessed below, level with, or extend above the surface of the housing 102. In the illustrated embodiment, the touch sensitive surface 111 of the touch pad 110 is substantially flush with the external surface of the housing 102.

The shape of the touch pad 110 may also be widely varied. For example, the touch pad 110 may be circular, rectangular, triangular, and the like. In general, the outer perimeter of the shaped touch pad defines the working boundary of the touch pad. In the illustrated embodiment, the touch pad 110 is circular. Circular touch pads allow a user to continuously swirl a finger in a free manner, i.e., the finger can be rotated through 360 degrees of rotation without stopping. Furthermore, the user can rotate his or her finger tangentially from all sides thus giving it more range of finger positions. For example, when the media player is being held, a left handed user may choose to use one portion of the touch pad 110 while a right handed user may choose to use another portion of the touch pad 110. More particularly, the touch pad is annular, i.e., shaped like or forming a ring. When annular, the inner and outer perimeter of the shaped touch pad defines the working boundary of the touch pad.

In addition to above, the media player 100 may also include one or more buttons 112. The buttons 112 are configured to provide one or more dedicated control functions for making selections or issuing commands associated with operating the media player 100. By way of example, in the case of an MP3 music player, the button functions may be associated with opening a menu, playing a song, fast forwarding a song, seeking through a menu and the like. In most cases, the button functions are implemented via a mechanical clicking action. The position of the buttons 112 relative to the touch pad 110 may be widely varied. For example, they may be adjacent one another or spaced apart. In the illustrated embodiment, the buttons 112 are configured to surround the inner and outer perimeter of the touch pad 110. In this manner, the buttons 112 may provide tangible surfaces that define the outer boundaries of the touch pad 110. As shown, there ,are four buttons 112A that surround the outer perimeter and one button 112B disposed in the center or middle of the touch pad 110. By way of example, the plurality of buttons 112 may consist of a menu button, play/stop button, forward seek button and a reverse seek button, and the like.

Moreover, the media player 100 may also include a power switch 114, a headphone jack 116 and a data port 118. The power switch 114 is configured to turn the media device 100 on and off. The headphone jack 116 is capable of receiving a headphone connector associated with headphones configured for listening to sound being outputted by the media device 100. The data port 118 is capable of receiving a data connector/cable assembly configured for transmitting and receiving data to and from a host device such as a general purpose computer. By way of example, the data port 118 may be used to upload or down load songs to and from the media device 100. The data port 118 may be widely varied. For example, the data port may be a PS/2 port, a serial port, a parallel port, a USB port, a Firewire port and the like. In some cases, the data port 118 may be a radio frequency (RF) link or optical infrared (IR) link to eliminate the need for a cable. Although not shown in FIG. 2, the media player 100 may also include a power port that receives a power connector/cable assembly configured for delivering powering to the media player 100. In some cases, the data port 118 may serve as both a data and power port.

Figure 3A:
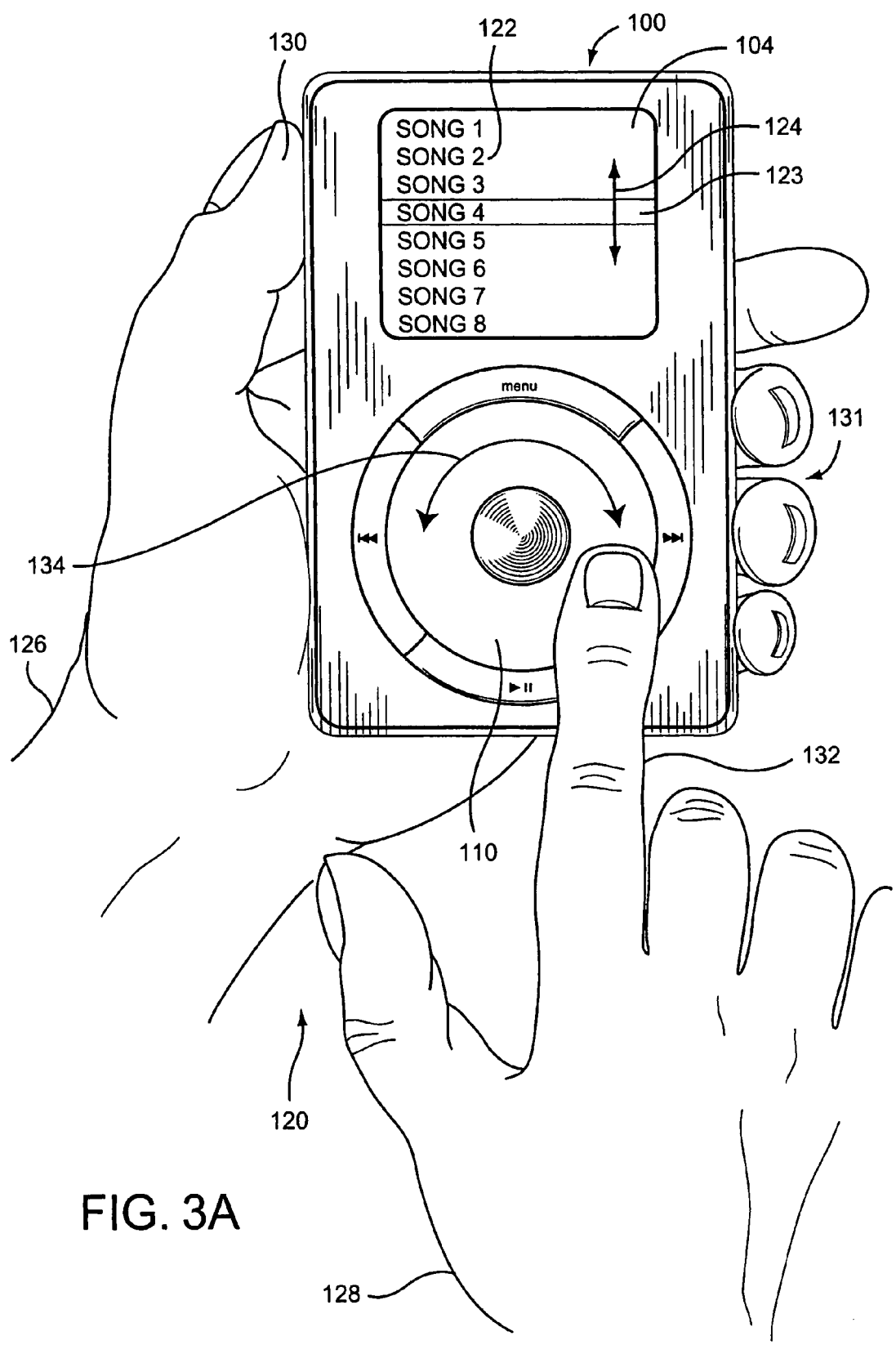
FIG. 3 is top view of a media player in use, in accordance with one embodiment of the present invention.
Figure 3B:
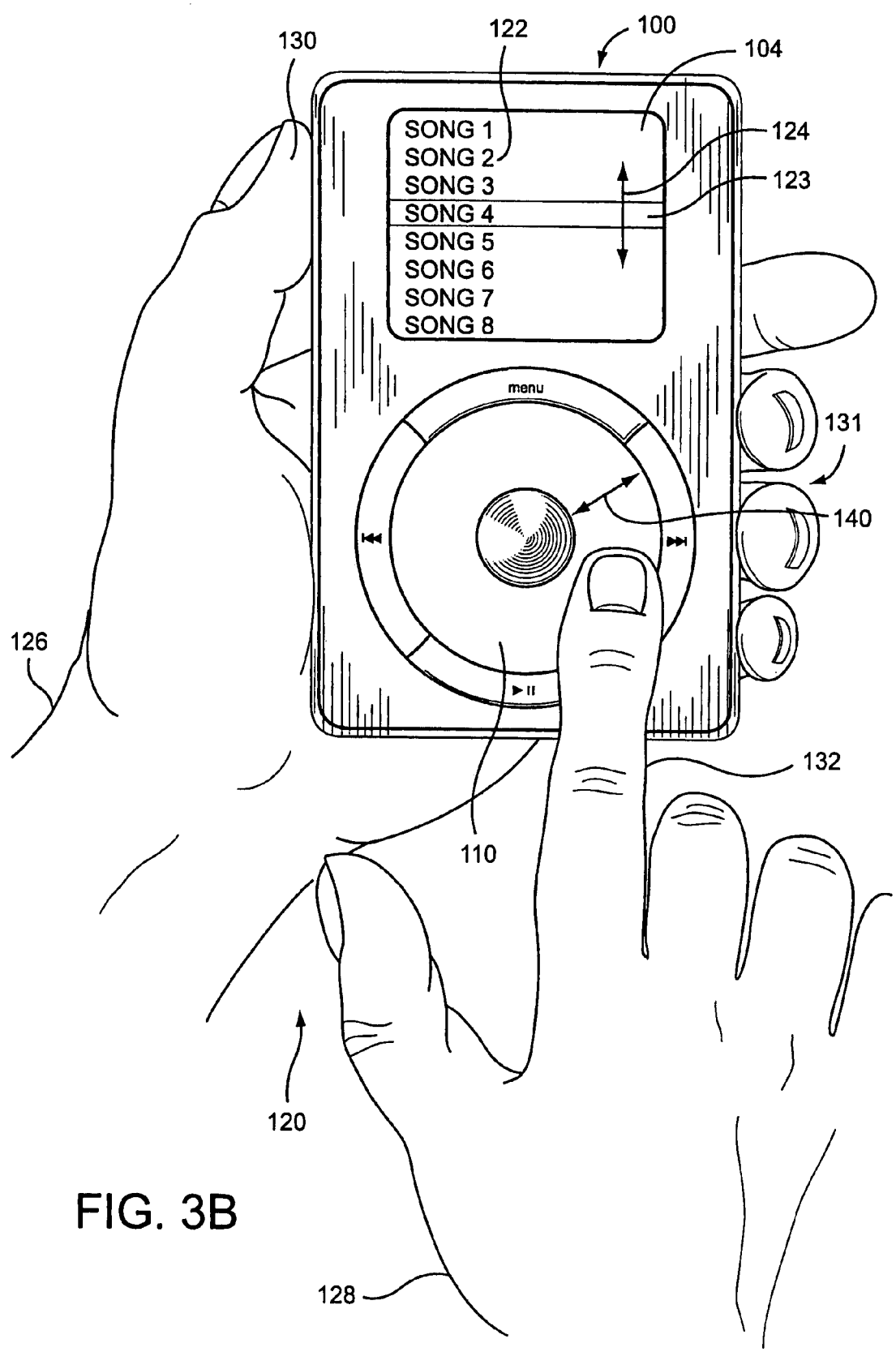
Figure 3C:
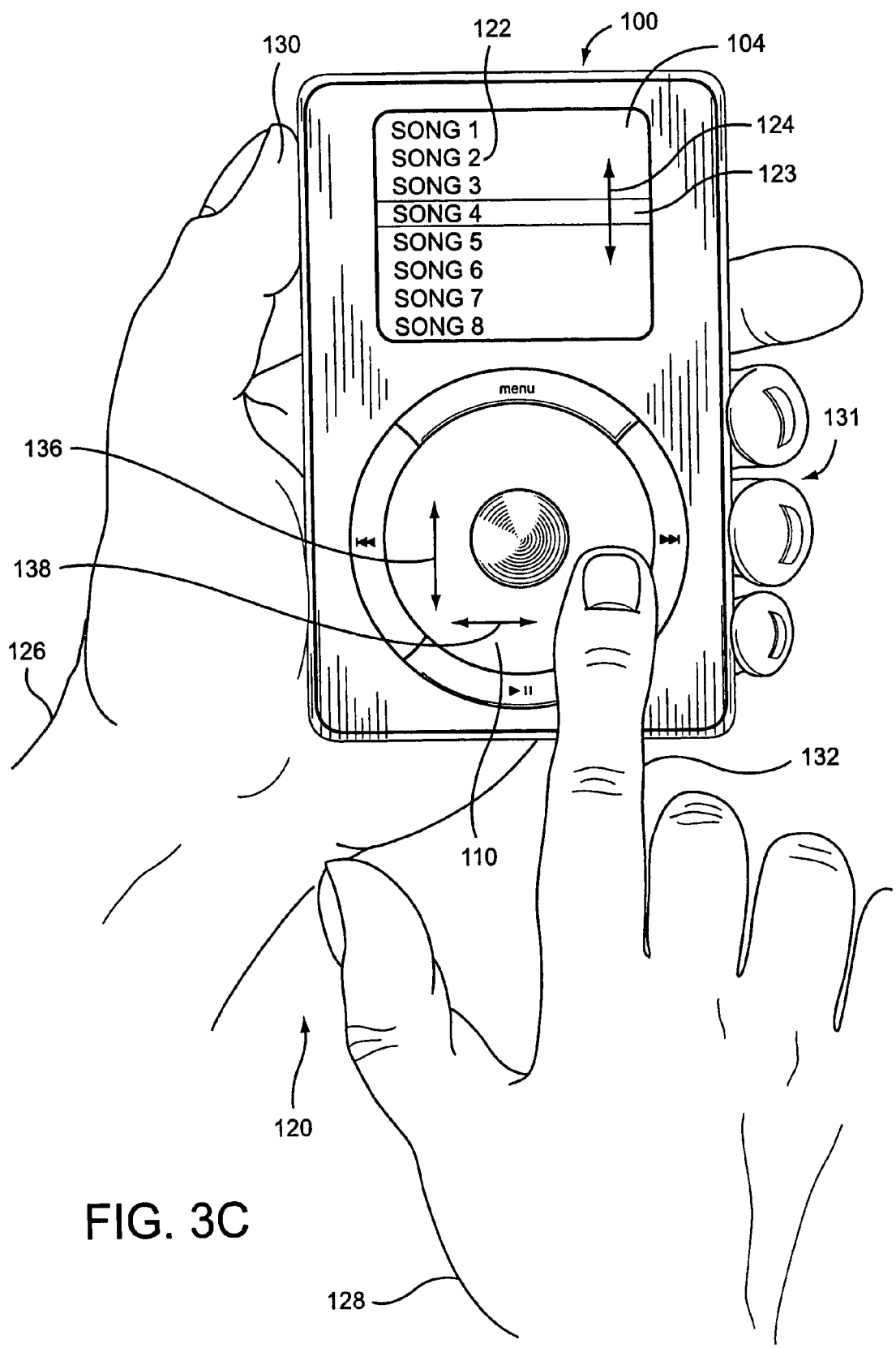

FIGS. 3A-3C show the media player 100 of FIG. 2 being used by a user 120, in accordance with different embodiments of the invention. In all of these embodiments, the user 120 is linearly scrolling 104 (as shown by arrow 124) through a list of songs 122 displayed on the display screen via a slider bar 123. As shown, the media device 100 is comfortably held by one hand 126 while being comfortably addressed by the other hand 128. This configuration generally allows the user 120 to easily actuate the touch pad 110 with one or more fingers. For example, the thumb 130 and rightmost fingers 131 (or leftmost fingers if left handed) of the first hand 126 are used to grip the sides of the media player 100 while a finger 132 of the opposite hand 128 is used to actuate the touch pad 110. As shown, the entire top surface of the touch pad 110 is accessible to the user's finger 130.

Referring to FIG. 3A, and in accordance with one embodiment of the invention, the touch pad 110 can be continuously actuated by a simple swirling motion of the finger 132 as shown by arrow 134. By swirling, it is meant that the finger moves in an arcuate or circular manner. For example, the finger may rotate relative to an imaginary axis. In particular, the finger can be rotated through 360 degrees of rotation without stopping. This form of motion may produce continuous or incremental scrolling on the display screen 104.

Referring to FIG. 3B, and in accordance with one embodiment of the invention, the user 120 can slide his or her finger 132 radially between the inner and outer perimeter of the touch pad 110. For example, the touch pad 110 may be actuated radially as shown by arrow 140.

Referring to FIG. 3C, and in accordance with one embodiment of the invention, the user 120 can slide his or her finger 132 substantially tangentially from all sides of the touch pad 110. For example, the touch pad 110 may be actuated forwards and backwards as shown by arrows 136 and side to side by arrows 138.

Figure 4:
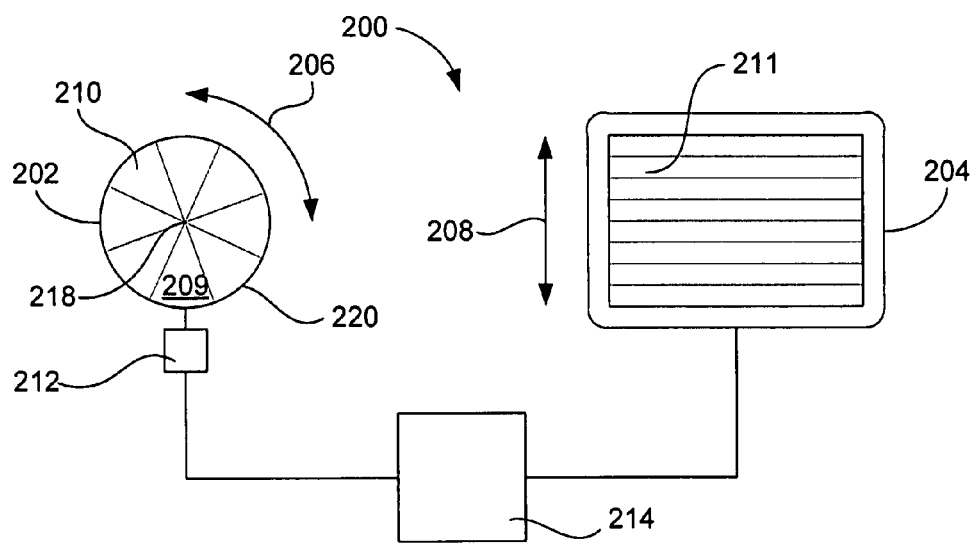
FIG. 4 is a simplified block diagram of a touchpad/display system, in accordance with one embodiment of the present invention.

FIG. 4 is a block diagram of a touchpad/display system 200, in accordance with one embodiment of the invention. By way of example, the touchpad/display system 200 may be used in the media player shown in FIGS. 2 and 3. The touchpad/display system 200 utilizes a touch pad 202 and a display screen 204. The touchpad/display system 200 via the touch pad 202 is configured to transform a swirling or whirling motion 206 of an object such as a finger (as shown in FIG. 3A) into translational or linear motion 208 on the display screen 204. In one embodiment, the touch pad 202 is arranged to continuously determine the angular position of an object relative to the planar surface 209 of the touch pad 202. This allows a user to linearly scroll through a media list 211 on the display screen 204 by swirling the object at least partially around the touch pad 202. For example, by moving the object between any angular positions (e.g., 0-360) on the touch pad 202.

As shown, the touch pad 202 is divided into several independent and spatially distinct zones 210 that are positioned around the periphery of the touch pad 202. Any number of zones may be used. In one embodiment, each of the zones 210 represents a polar angle that specifies the angular position of the zone in the plane of the touch pad 202. By way of example, the zones 210 may be positioned at 2 degree increments all the way around the touch pad 202. Each of the zones 210 has an associated sensor disposed therein for detecting the presence of an object such as a finger. The sensors may be widely varied. For example, the sensors may be based on resistive sensing, surface acoustic wave sensing, pressure sensing (e.g., strain gauge, pressure plates, piezoelectric transducers or the like), optical sensing, capacitive sensing and the like. In general, when an object approaches a zone 210, and more particularly a sensor, a position signal is generated that informs the media system 200 that the object is at a specific angular position on the touch pad 202. When an object is moved between zones 210 or over multiple zones 210, multiple position signals are generated. These multiple position signals may be used to determine the angular location, direction, speed and acceleration of the object as its moved around the touch pad 202.

The system 200 also includes a control assembly 212 that is coupled to the touch pad 202. The control assembly 212 is configured to acquire the position signals from the sensors and to supply the acquired signals to a processor 214 of the system. By way of example, the control assembly 212 may include an application specific integrated circuit (ASIC) that is configured to monitor the signals from the sensors, to compute the angular location, direction, speed and acceleration of the monitored signals and to report this information to the processor 214.

The processor 214 is coupled between the control assembly 212 and the display screen 204. The processor 214 is configured to control motion inputs to the display screen 204. In one sequence, the processor 214 receives angular motion information from the control assembly 212 and then determines the next items of the media list 211 that are to be presented on the display screen 204. In making this determination, the processor 214 can take into consideration the length of the media list 211. Typically, the processor 214 will determine the rate of movement of the finger such that the transitioning to different items in the media list 211 can be performed faster when the finger is moved at greater speeds. In effect, to the user, the more rapid swirling of the finger enables effective acceleration of the transitioning of the list of media items 211. Alternatively, the control assembly 212 and processor 214 may be combined in some embodiments.

Although not shown, the processor 214 can also control a buzzer to provide audio feedback to a user. The audio feedback can, for example, be a clicking sound produced by the buzzer. In one embodiment, the buzzer 216 is a piezoelectric buzzer. As the rate of transitioning through the list of media items increases, the frequency of the clicking sounds increases. Alternatively, when the rate that the finger is moved slows, the rate of transitioning through the list of media items decreases, and thus the frequency of the clicking sounds correspondingly slows. Hence, the clicking sounds provide audio feedback to the user as to the rate in which the media items within the list of media items are being traversed.

Additionally or alternatively, the system via the touch pad may be configured to transform radial motion an object such as a finger (as shown in FIG. 3B) into translational or linear motion on the display screen. By radial, it is meant that the object moves in a substantially radial direction from the center of the touch pad to an outer perimeter of the touch pad. In one embodiment, the touch pad is arranged to continuously determine the radial position of a finger relative to the planar surface of the touch pad. This allows a user to linearly scroll through a media list on the display screen by moving the object at least partially between the center and outer perimeter of the touch pad. For example, by moving the object between a small and large radius (e.g., 0-3 cm) on the touch pad. This may also allow a user to vary a characteristic of the media player. For example, by moving radially, the user may be able to change the volume of sound being played on the media player (i.e., acts like a potentiometer).

Figure 5:
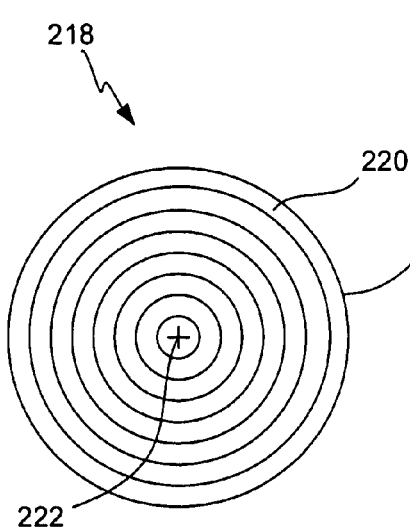
FIG. 5 is a top view of a sensor arrangement of a touch pad, in accordance with another embodiment of the present invention.

Referring to FIG. 5, a radial touch pad 218 will be discussed in accordance with one embodiment. By way of example, the touch pad 218 may replace the touch pad shown in FIG. 4. The touch pad 218 may be divided into several independent and spatially distinct zones 220 that are positioned radially from the center 222 of the touch pad 218 to the perimeter 224 of the touch pad 218. Any number of radial zones may be used. In one embodiment, each of the radial zones 220 represents a radial position in the plane of the touch pad 218. By way of example, the zones 220 may be spaced at 5 mm increments. Like above, each of the zones 220 has an associated sensor disposed therein for detecting the presence of an object such as a finger. In general, when an object approaches a zone 220, and more particularly a sensor, a position signal is generated that informs the system 200 that the object is at a specific radial position on the touch pad 218. When an object is moved between zones 220 or over multiple zones 220, multiple position signals are generated. These multiple position signals may be used to determine radial location, direction, speed and acceleration of the object as its moved radially across the touch pad 218.

Figure 6:
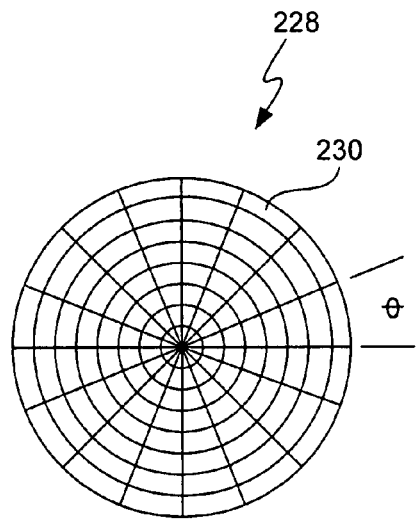
FIG. 6 is a top view of a sensor arrangement of a touch pad, in accordance with another embodiment of the present invention.

Referring to FIG. 6, a combination angular/radial touch pad 228 will be discussed in accordance with one embodiment. By way of example, the touch pad 228 may replace the touch pad shown in FIG. 4. The touch pad 228 may be divided into several independent and spatially distinct zones 230 that are positioned both angularly and radially about the periphery of the touch pad 228 and from the center of the touch pad 202 to the perimeter of the touch pad 228. Any number of combination zones may be used. In one embodiment, each of the combination zones 230 represents both an angular and radial position in the plane of the touch pad 228. By way of example, the zones may be positioned at both 2 degrees and 5 mm increments. Like above, each of the combination zones 230 has an associated sensor disposed therein for detecting the presence of an object such as a finger. In general, when an object approaches a combination zone 230, and more particularly a sensor, a position signal is generated that informs the system 200 that the object is at a specific angular and radial position on the touch pad 228. When an object is moved between combination zones 230 or over multiple combinations zones 230, multiple position signals are generated. These multiple position signals may be used to determine location, direction, speed and acceleration of the object as its angularly and radially moved across the touch pad 228. The angular and radial zones may be initiated at the same time or they may be initiated at different times. For example, the angular zones may be initiated for scrolling through a media player and the radial zones may be initiated for varying the volume of a media player.

It should be noted that although the touch pads of FIGS. 4-6 are all shown as circular that they may take on other forms such as other curvilinear shapes (e.g., oval, annular and the like), rectilinear shapes (e.g., hexagon, pentagon, octagon, rectangle, square, and the like) or a combination of curvilinear and rectilinear (e.g., dome).

Figure 7:
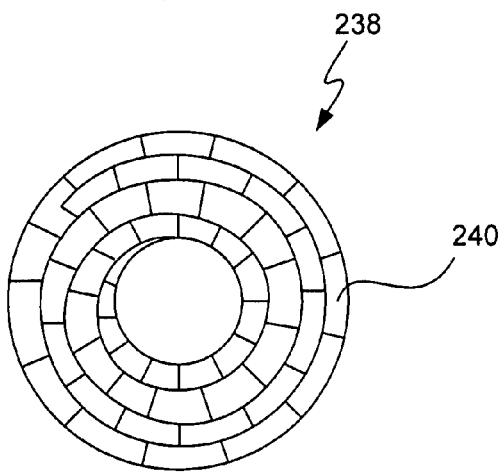
FIG. 7 is a top view of a sensor arrangement of a touch pad, in accordance with another embodiment of the present invention.

Furthermore, in order to provide higher resolution, a more complex arrangement of zones may be used. For example, as shown in FIG. 7, the touch pad 238 may include angular and radial zones 240 that are broken up such that consecutive zones do not coincide exactly. In this embodiment, the touch pad 202 has an annular shape and the zones 240 follow a spiral path around the touch pad 202 from the center to the outer perimeter of the touch pad 202.

Figure 8:
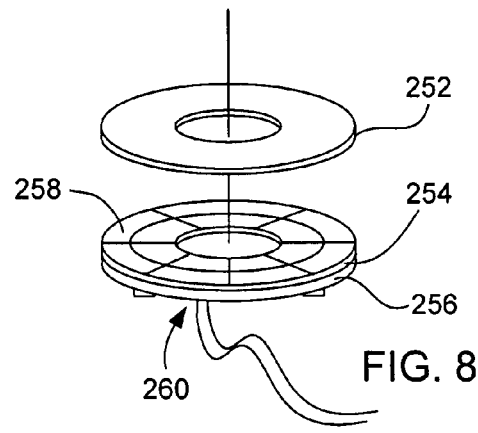
FIGS. 8 is a partially broken away perspective view of an annular capacitive touch pad, in accordance with one embodiment of the present invention.

FIGS. 8 is a partially broken away perspective view of an annular capacitive touch pad 250, in accordance with one embodiment of the present invention. By way of example, the annular capacitive touch pad 250 may correspond to the touch pad of FIG. 2. The annular capacitive touch pad 250 is arranged to detect changes in capacitance as the user swirls an object such as a finger around the touch pad 250. The annular capacitive touch pad 250 is also arranged to detect changes in capacitance as the user moves their finger radially across the touch pad 250. The annular capacitive touch pad 250 is formed from various layers including at least a label layer 252, an electrode layer 254 and a circuit board 256. The label layer 252 is disposed over the electrode layer 254 and the electrode layer 254 is disposed over the circuit board 256. At least the label 252 and electrode layer 254 are annular such that they are defined by concentric circles, i.e., they have an inner perimeter and an outer perimeter. The circuit board 256 is generally a circular piece having an outer perimeter that coincides with the outer perimeter of the label 252 and electrode layer 254. It should be noted, however, that in some cases the circuit board 256 may be annular or the label 252 and electrode layer 254 may be circular.

The label layer 252 serves to protect the underlayers and to provide a surface for allowing a finger to slide thereon. The surface is generally smooth so that the finger does not stick to it when moved. The label layer 252 also provides an insulating layer between the finger and the electrode layer 254. The electrode layer 254 includes a plurality of spatially distinct electrodes 258 that have positions based on the polar coordinate system. For instance, the electrodes 258 are positioned both angularly and radially on the circuit board 256 such that each of the electrodes 258 defines a distinct angular and radial position thereon. Any suitable number of electrodes 258 may be used. In most cases, it would be desirable to increase the number of electrodes 258 so as to provide higher resolution, i.e., more information can be used for things such as acceleration.

When configured together, the touch pad 250 provides a touch sensitive surface that works according to the principals of capacitance. As should be appreciated, whenever two electrically conductive members come close to one another without actually touching, their electric fields interact to form capacitance. In this configuration, the first electrically conductive member is one or more of the electrodes 258 and the second electrically conductive member is the finger of the user. Accordingly, as the finger approaches the touch pad 250, a tiny capacitance forms between the finger and the electrodes 258 in close proximity to the finger. The capacitance in each of the electrodes 258 is measured by control circuitry 260 located on the backside of the circuit board 256. By detecting changes in capacitance at each of the electrodes 258, the control circuitry 260 can determine the angular location, direction, speed and acceleration of the finger as it is moved across the touch pad 250. The control circuitry 260 can also report this information in a form that can be used by a computing device. By way of example, the control circuitry may include an ASIC (application specific integrated circuit).

Figure 9:
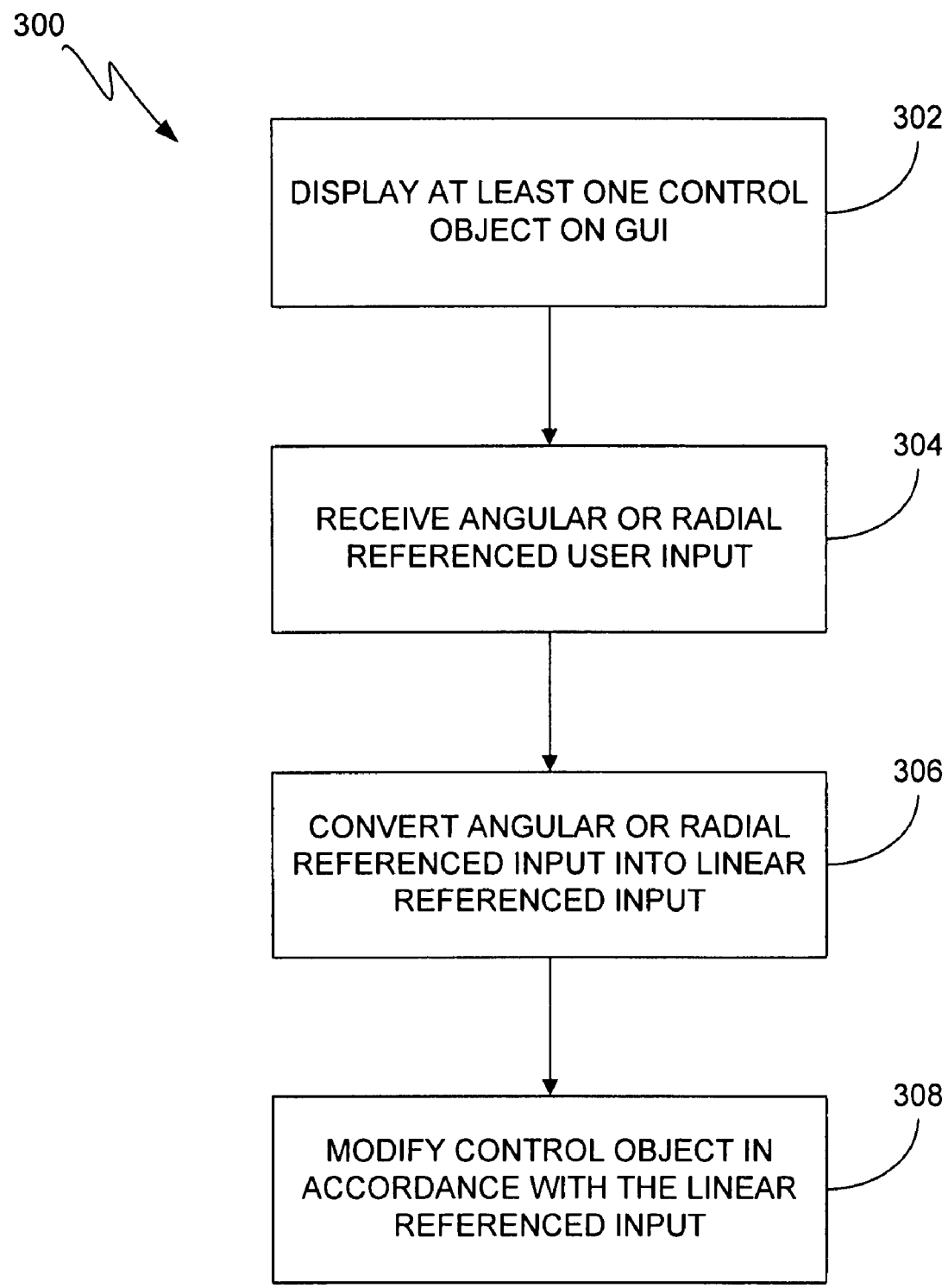
FIG. 9 is a flow diagram of touch pad-display processing, in accordance with one embodiment of the invention.

FIG. 9 is a flow diagram of touch pad-display processing 300, in accordance with one embodiment of the invention. The touch pad-display processing 300 allows a user to interact with a graphical user interface of a computing device. The touch pad-display processing 300 generally begins at block 302 where at least one control object is displayed on the graphical user interface. By way of example, the control object may be a slider bar that highlights information from a list in a menu displayed on a graphical user interface on a display screen. The displayed control object is generally controlled by the processor 214 illustrated in FIG. 3. Following block 302, the touch pad-display processing proceeds to block 304 where a user input is received. The user input may be received by the processor 214 illustrated in FIG. 3. In one embodiment, the user input is an angular referenced input, as for example, a user input produced by a rotational user action such as a finger swirling across the touch pad. By way of example, the touch pad may correspond to the touch pad illustrated in FIG. 3. In another embodiment, the user input is a radial referenced input, as for example, a user input produced by a radial user action such as a finger radially moving across the touch pad. By way of example, the touch pad may correspond to the touch pad illustrated in FIG. 4.

Following block 304, the touch pad-display processing proceeds to block 306 where the angular or radial referenced user input is converted into a linear referenced input. The conversion may be implemented by the processor 212 illustrated in FIG. 3. Following block 306, the touch pad-display processing proceeds to block 308 where control object is modified in accordance with the linear referenced input. For example, the control object such as a slider bar may be linearly moved from a first item to a second item on a list or it may be moved through multiple items on a list (e.g., scrolling). The modification is generally implemented when the processor 214 illustrated in FIG. 3 supplies the linear referenced input to the graphical user interface on the display screen.

The various aspects of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over a network coupled computer systems so that the computer readable code is stored and executed in a distributed fashion.

Furthermore, although a scrolling feature is described, it should be noted that a scrolling feature is not a limitation and that the touch pad may be used to manipulate other features. For example, the touch pad may be used to adjust a volume control in an audio application. In addition, the touch pad may be used to advance through frames in a movie in video editing applications. The touch pad may also be used in video game applications.

The advantages of the invention are numerous. Different embodiments or implementations may yield one or more of the following advantages. It should be noted that this is not an exhaustive list and there may be other advantages which are not described herein. One advantage of the invention is that a user is able to easily and rapidly traverse a lengthy list of media items. Another advantage of the invention is that a substantial portion of the touch pad is accessible to the user, i.e., the touch pad provides a large surface area for manipulation thereof. Another advantage of the invention is that the touch pad can be continuously actuated by a simple swirling motion of a finger, i.e., the finger can be rotated through 360 degrees of rotation without stopping. Another advantage of the invention is that the touch pad provides more range of finger positions. For example, a left handed user may choose to use one portion of the touch pad while a right handed user may choose to use another portion of the touch pad. In essence, the touch pad is more ergonomic. Another advantage of the invention is that the touch pad makes the media player more aesthetically pleasing. Another advantage of the invention is that the touch pad allows an intuitive way to scroll on a display screen. For example, the user can manipulate the his or her finger side to side for horizontal scrolling and the user can manipulate his or her finger backwards and forwards for vertical scrolling.

While this invention has been described in terms of several preferred embodiments, there are alterations, permutations, and equivalents, which fall within the scope of this invention. For example, although the invention has been described in terms of an MP3 music player, it should be appreciated that certain features of the invention may also be applied to other types of media players such as video recorders, cameras, and the like. Furthermore, the MP3 music player described herein is not limited to the MP3 music format. Other audio formats such as MP3 VBR (variable bit rate), AIFF and WAV formats may be used. Moreover, certain aspects of the invention are not limited to handheld devices. For example, the touch pad may also be used in other computing devices such as a portable computer, personal digital assistants (PDA), cellular phones, and the like. The touch pad may also be used a stand alone input device that connects to a desktop or portable computer. It should also be noted that there are many alternative ways of implementing the methods and apparatuses of the present invention. For example, although the touch pad has been described in terms of being actuated by a finger, it should be noted that other objects may be used to actuate it in some cases. For example, a stylus or other object may be used in some configurations of the touch pad. It is therefore intended that the following appended claims be interpreted as including all such alterations, permutations, and equivalents as fall within the true spirit and scope of the present invention.

What is claimed is:

1. A battery powered handheld electronic device that stores and plays media such as audio, video or images, the handheld electronic device comprising:
   a memory device configured to store a plurality of media items in a digital format;
   a display configured to present a group of media items from the plurality of stored media items and to present a visual indicator that is capable of scrolling through the displayed group of media items in order to designate a specific media item from the group of media items; and
   an input arrangement including a curvilinear inner input region and one or more curvilinear outer input regions that provide control functions for operating the battery powered handheld electronic device, the outer input regions being disposed outside the inner input region, the inner input region including at least a touch pad configured to receive input from a sliding motion or a tapping motion of a finger, the sliding motion of the finger controlling the movement of the visual indicator through the group of media items, the tapping motion of the finger selecting the specific media item that is designated by the visual indicator.

2. The handheld electronic device as recited in claim 1 further comprising: a plurality of buttons configured to receive input from a finger pressing thereon, the button functions controlling various aspects of the handheld electronic device, the functions of the buttons being distinct from the functions of the touch pad.

3. The handheld electronic device as recited in claim 2 wherein there are at least four buttons.

4. The handheld electronic device as recited in claim 3 wherein the buttons include at least a menu button, play/stop button, forward seek button and a reverse seek button.

5. The handheld electronic device as recited in claim 1 wherein the buttons are disposed about the touch pad.

6. The handheld electronic device as recited in claim 5 wherein the buttons are adjacent one another and the touch pad.

7. The handheld electronic device as recited in claim 6 wherein tangible surfaces are provided between the buttons and touch pad so as to physically define their boundaries.

8. The handheld electronic device as recited in claim 1 wherein the touch pad is recessed below a surface of a housing of the handheld electronic device.

9. The handheld electronic device as recited in claim 1 wherein the touch pad is circular.

10. The handheld electronic device as recited in claim 9 wherein the circular touch pad is annular and wherein the width of the annularly circular touch pad is capable of receiving tangential and swirling sliding motions.

11. The handheld electronic device as recited in claim 1 wherein the sliding motion of the finger also controls the volume of audio being outputted by the media device.

12. A battery powered handheld music player, comprising:
   a housing that supports various electrical components that provide computing operations for the music player;
   a memory device disposed inside the housing and configured to store a plurality of songs in a digital format;
   a display screen provided at a first portion of a front surface of the housing, and configured to present a list of songs from the plurality of stored songs and to present a visual indicator that is capable of linearly traversing through the list of songs in order to designate a specific song from the list of songs;
   a single integrated input arrangement provided at a second portion of the front surface of the housing, the single integrated input arrangement including a curvilinear inner input region and a plurality of curvilinear outer input regions disposed outside the inner input region that are adjacent one another and that provide control functions for operating the music player, the inner input region being implemented with a touch pad; and
   audio output components for outputting music associated with a selected specific song from the list of songs.

13. The music player as recited in claim 12 wherein the control functions include moving the visual indicator through the list of songs and making selections of songs that are designated by the visual indicator, adjusting the volume of the music being outputted by the music player, and initiating commands associated with the music player.

14. The music player as recited in claim 12 wherein at least one of the outer input regions provides control functions for moving the visual indicator through the list of songs, and selecting a song to be played from the list of songs.

15. The music player as recited in claim 14 wherein the at least one of the outer input regions is also configured to provide control functions for adjusting the volume of the music being outputted by the music player.

16. The music player as recited in claim 14 wherein the remaining outer input regions are configured to provide control functions for adjusting the volume of the music being outputted by the music player initiating menu, play/pause, previous, and next commands.

17. The music player as recited in claim 12 wherein the input arrangement is circular.

18. The music player as recited in claim 12 wherein the input arrangement is rectangular.

19. The music player as recited in claim 12 wherein tangible surfaces are provided at the boundaries of the input regions so as to physically define their position within the input arrangement.

20. A battery powered handheld device capable of playing media, comprising:
- a housing that supports various electrical components that provide computing operations for the battery powered handheld device;
- a memory device disposed inside the housing and configured to store a plurality of menu items;
- a display screen provided at a first portion of a front surface of the housing, and configured to present a list of menu items and to present a visual indicator that is capable of linearly traversing through the list of menu items in order to designate a specific menu item from the list of menu items; and
- an input arrangement provided at a second portion of the front surface of the housing, the input arrangement including curvilinear inner input region and one or more curvilinear outer input regions that provide control functions for operating the battery powered handheld device, the outer input regions being disposed outside the inner input region, the inner input region including at least a touch pad.

21. The battery powered handheld device as recited in claim 20 wherein the inner input region provides control functions for at least controlling the visual indicator and selecting a menu item from the list of menu items.

22. The battery powered handheld device as recited in claim 21 wherein the outer input regions provide control functions for initiating commands in the battery powered handheld device.

23. The battery powered handheld device as recited in claim 20 wherein the inner input region further includes a button integrated within the touch surface of the touch pad.

24. The battery powered handheld device as recited in claim 20 wherein the input arrangement is circular.

25. The battery powered handheld device as recited in claim 20 wherein the touch pad is recessed below the outer surface of the housing.

26. The battery powered handheld device as recited in claim 20 wherein the outer input regions are configured to surround the perimeter of the inner input region.

27. The battery powered handheld device as recited in claim 20 wherein tangible surfaces are provided at the boundaries of the inner and outer input regions so as to physically define their position within the input arrangement.

28. The battery powered handheld device as recited in claim 20 further comprising an audio feedback device disposed inside the housing, and configured to provide audio feedback in conjunction with movement of the visual indicator as it traverses through the menu list.

29. The battery powered handheld device as recited in claim 20 wherein the input arrangement includes at least four outer input regions.

30. The battery powered handheld device as recited in claim 20 wherein the outer input regions include at least a first input region associated with a menu command, a second input region associated with play and stop command, a third input region associated with a forward seek command and a fourth input region associated with a reverse seek command.

* * * * *

UNITED STATES PATENT AND TRADEMARK OFFICE
CERTIFICATE OF CORRECTION

| | |
|---|---|
| PATENT NO. | : 7,333,092 B2 |
| APPLICATION NO. | : 11/806957 |
| DATED | : February 19, 2008 |
| INVENTOR(S) | : Zadesky et al. |

It is certified that error appears in the above-identified patent and that said Letters Patent is hereby corrected as shown below:

On the Title Page:

Item (75) "INVENTORS":

Please replace "Portola Valley" with --San Carlos--.

Under Section (57) "ABSTRACT":

On Line 36, please replace "deice" with --device--.

On page 4, under Section (56) "FOREIGN PATENT DOCUMENTS":

In Column 1, Line 16, please replace "6/1985" with --6/1982--.

In Column 1, Line 44, please delete "JP    6-99639      4/1994".

In Column 1, Line 46, please delete "JP    6-111695     4/1994".

In Column 1, Line 54, please delete "JP    7-107574     4/1995".

In Column 1, Line 56, please delete "JP    07-107574 A  4/1995".

In Column 1, Line 57, please delete "JP    7-41882      7/1995".

In Column 1, Line 62, please delete "JP    7-261899     10/1995".

In Column 1, Line 64, please delete "JP    07-261899 A  10/1995".

In Column 1, Line 70, please delete "JP    8-115158     5/1996".

In Column 2, Line 7, please delete "JP    9-230993     9/1997".

In Column 2, Line 20, please delete "JP    11-194863 A  7/1999".

In Column 2, Line 22, please delete "JP    11-194872 A  7/1999".

In Column 2, Line 25, please delete "JP    11-194883 A  7/1999".

In Column 2, Line 36, please delete "JP    11-272378 A  10/1999".

UNITED STATES PATENT AND TRADEMARK OFFICE
CERTIFICATE OF CORRECTION

PATENT NO. : 7,333,092 B2
APPLICATION NO. : 11/806957
DATED : February 19, 2008
INVENTOR(S) : Zadesky et al.

It is certified that error appears in the above-identified patent and that said Letters Patent is hereby corrected as shown below:

<u>On page 5, under Section (56) "OTHER PUBLICATIONS":</u>

In Column 2, Line 27, please replace "input" with --Input--.

<u>In the Specification:</u>

In Page 15, Column 5, Line 30, please replace "FIGS." with --FIG.--.

In Page 16, Column 7, Line 61, please insert a period --.-- after "direction".

In Page 18, Column 12, Line 53, please replace "FIGS." with --FIG.--.

Signed and Sealed this

Thirtieth Day of September, 2008

JON W. DUDAS
*Director of the United States Patent and Trademark Office*